United States Patent Office 3,492,269
Patented Jan. 27, 1970

3,492,269
EPOXY RESIN HARDENING PROCESS USING INORGANIC METAL SALT ACCELERATORS
Paul Janssen, Cologne, and Wilhelm Vogt and Hermann Richtzenhain, Cologne-Sulz, Germany, assignors to Dynamit Nobel Aktiengesellschaft, Troisdorf, Bezirk Cologne, Germany, a corporation of Germany
No Drawing. Continuation of application Ser. No. 442,512, Mar. 24, 1965. This application Nov. 22, 1967, Ser. No. 685,983
Claims priority, application Germany, Mar. 26, 1964, D 44,007
Int. Cl. C08g 30/14
U.S. Cl. 260—47                                                  5 Claims

ABSTRACT OF THE DISCLOSURE

Process for accelerating the hardening of epoxy resins by reacting an epoxy resin with an amine in the presence of an inorganic metal salt as accelerator for said hardening.

---

This is a streamlined continuation of application Ser. No. 442,512, filed Mar. 24, 1965.

This invention relates to a process for accelerating the reaction of epoxy compounds with compounds containing $NH_2$ and/or NH groups in their molecules, and, more particularly, relates to a process for accelerating the reaction of mono- and poly-epoxy compounds with compounds containing either one NH and one $NH_2$ group, or at least more than one $NH_2$ and/or NH groups by effecting the reaction in the presence of a metal salt of an inorganic acid, provided that the same does not simultaneously contain both an N and an S atom as an accelerator. Further, the invention relates to an improved novel epoxy resin material which may be hardened into a superior cured resin exhibiting substantially superior mechanical properties compared to the known epoxy resin materials.

The reaction of epoxy compounds with monovalent or polyvalent aliphatic, aromatic or hydro-aromatic amines, amides or carboxylic acid amides which contain, in addition to the carboxylic amide group, one or more NH or $NH_2$ groups is known. This reaction is industrially important as a method for amine hardening epoxy resins. However, the amine hardening takes place very slowly and, depending on the nature of the epoxy resin and the hardener used, may even take several days. As, in many cases, a rapid hardening is desired, numerous attempts have been made to accelerate the hardening reaction. Thus, it has been proposed to employ phenol or its derivatives, such as for example 2,4,6-tris-(dimethylaminomethyl)-phenol (and is available under the trade designation DMP 30) as an accelerator. Furthermore, sulfur-containing compounds, as, for instance, compounds having a mercapto, sulfide, disulfide or sulfoxide group in which the sulfur is not bound cyclically, have also been proposed for use as compounds for accelerating the reaction of epoxy resins with conventional hardening agents. Proposals have also been made to use as accelerating agents, alcohols, carboxylic acids, sulfonamides with free hydrogen amide, etc. However, the acceleration which is achieved with any of the aforesaid compounds is still far from commercially satisfactory.

It is among the objects of this invention to provide a process for accelerating the reaction of epoxy compounds with compounds containing either one NH and one $NH_2$ group or a plurality of $NH_2$ and/or NH groups that is easily and safely practiced and efficient.

Another object is to provide a process for accelerating the reaction of epoxy compounds with compounds containing either one NH and one $NH_2$ group or a plurality of $NH_2$ and/or NH groups that is equally suitable for almost all reactions involving epoxy compounds and compounds containing either one NH and one $NH_2$ group or a plurality of $NH_2$ and/or NH groups.

A still further object of this invention is the preparation of novel products comprising the reaction of an epoxy compound and a product containing one NH and one $NH_2$ group or a plurality of $NH_2$ and/or NH groups in the presence of an accelerator comprising a metal salt of an inorganic acid, which salt does not simultaneously contain an N and S atom in the acid radical thereof.

These and other objects will become apparent during the following discussion:

Now, in accordance with the invention, it has been found that the reaction of epoxy compounds with compounds containing one NH and one $NH_2$ group or at least one NH and/or $NH_2$ group can be substantially accelerated if the reaction is conducted in the presence of a catalytic amount of a metal salt of a monobasic or polybasic inorganic acid which does not simultaneously contain sulfur and nitrogen in the acid radical. Practically any metal salt of an inorganic acid subject to the above limitation is capable of accelerating the reaction of the amine compound with the epoxy compound if the precaution is taken that the metal salt is dissolved wholly or at least partially in the polyamine or poly amido amine reactant employed in the reaction.

The solubility of the metal salts can be increased by the addition of small amounts of a polar solvent to the amine reactant. In very many cases, such addition is unnecessary since many salts dissolve without any solubilizer to form an adequate concentration in the amine reactant.

Suitable solvents for use in increasing the solubility of the metal salts in the amine reactant are, for example, water, monovalent or polvalent alcohols, alkyl ethers of polyvalent alcohols, acid amides of simple organic acids such as formamide, dimethylformamide, lactic acid amide, dimethyl sulfoxide, tetramethylenesulfone, etc. It is quite sufficient to use the above-mentioned solubilizers in concentrations of 0.2 to 3 wt. percent referred to the epoxy reactant to be hardened.

The acceleration of the amine hardening of polyepoxy compounds that can be obtained with the salts disclosed in accordance with the invention exceeds by several times that achieved with the catalysts previously known.

Examples of suitable metal salts of inorganic acids which do not contain sulfur and nitrogen simultaneously in the acid radical and which can be used as accelerators in accordance with the invention include KCl, NaCl, NaBr, $Na_2SO_4$, $Na_3PO_3$, $Na_3PO_4$, $CaCl_2$, $Al_2(SO_4)_3$, $SnCl_2$, $SrCl_2$, $MnCl_2$, $MnSO_4$, $Sr(NO_3)_2$, $Pb(NO_3)_2$, $Al(NO_3)_3$, $ZnCl_2$, KI, $BaCl_2$, $Ca(NO_3)_2$, $FeCl_3$, $Na_2B_4O_7$, NaI, etc.

In general, the mixtures consisting of amine hardener, inorganic salt, and possibly a solubilizer are used for the cold hardening of epoxy resins. The amounts of accelerating agent to be added can vary over a broad range and depends on the reactivity of the amine and/or epoxy components. Generally, the accelerator is used in an amount ranging from 0.1 to 5% by weight of the epoxy compound being hardened. However, smaller or larger amounts of accelerator may be employed with particularly advantageous results.

Illustrative of the polyepoxy compounds which can be reacted with compounds containing NH or $NH_2$ groups are the following: the epoxides of poly unsaturated hydrocarbons, such as butadiene, cyclohexadiene, vinylcyclohexane, dicyclopentadiene, cyclododecatriene, polybutadiene, divinylbenzene, epoxide ethers of polyvalent alcohols such as ethylene, propylene, and butylene glycol, polyglycols, thiodiglycols, glycerine, pentaerythritol, sorbitol, etc., epoxide ethers of polyvalent phenols, for example, resorcinol hydroquinone, 4,4'-dioxydiphenyl, 4,4'-dioxydiphenylmethane, 2,2-bis-(4-oxyphenyl)-propane, 4,4'-dioxydiphenylsulfone and their oxyethyl ethers, phenol-formaldehyde condensation products, epoxides containing nitrogen for example, N,N-diglycidylaniline, N,N'-dimethyldiglycidyl-4,4'-diaminodiphenylmethane, and epoxides which are obtainable by conventional methods from carboxylic acids or other acid compounds such as cyanuric acid, cyclic trimethylene trisulfone, etc., or their derivatives.

Mixtures of the aforesaid pure epoxy compounds, including mixtures of monoepoxy and/or polyepoxy compounds can be reacted according to the present practice just as well as the pure epoxy compounds per se in the presence of solvents or plasticizers.

Included among the compounds containing NH or $NH_2$ groups which can be advantageously employed in the reaction with any of the above-mentioned epoxy compounds are the following: aliphatic, cycloaliphatic, aromatic and heterocyclic amines, imines, amides and imides containing at least two of the said functional groups, amidoamines of carboxylic, sulfonic and sulfocarboxylic acids, ether amines and oxyamines, and polymeric amines, imines, amides and imides.

The epoxy resins which are cured with compounds containing $NH_2$ or NH groups in the presence of an accelerator as set forth in accordance with the invention exhibit a greater cross-linking which is a direct result of the rapid hardening which is the result of the instant reaction and which, in turn, results in epoxy resin products characterized by improved mechanical properties as compared to the epoxy resins cured in the absence of any accelerator.

The reaction products of the process of the invention, where mono epoxides are the starting materials, constitute valuable intermediates for the manufacture of drugs, textile adjuvant and plastic products. Mixtures of poly epoxides, compounds containing $NH_2$ and/or NH groups and accelerators, in accordance with the instant invention, are suitable for use as fast-curing casting resins, coating substances, varnish resins and adhesives. It is possible, in accordance with the invention, to add fillers, pigments, coloring agents, plasticizers and the like to form resins suitable for many purposes.

The more detailed practice of the invention is illustrated by the following examples. There are, of course, many forms of the invention other than these specific embodiments.

In the following examples, the time for the reaction of the epoxy compounds with the compounds containing $NH_2$ or NH groups and the accelerators is given as well as the time required when no accelerators are used.

EXAMPLE 1

1 g. water and 1 g. of an accelerator from the list in the following table were mixed into 14 g. bis-1,4-(γ-aminopropoxy)-butane, and this mixture was used to harden, at 22° C., 50 g. of a diglycidyl ether of bis-2,2-(4-oxyphenyl)-propane and having 0.53 epoxy equivalents per 100 grams of resin.

| Accelerator: | Gelling time (in minutes) |
|---|---|
| None | 90 |
| Sodium bromide | 18 |
| Potassium iodide | 18 |
| Strontium chloride | 14 |
| Sodium chloride | 21 |
| Barium chloride | 15 |
| Aluminum nitrate | 15 |
| Manganese-2-sulfate | 15 |

EXAMPLE 2

14 g. bis-1,4-(γ-aminopropoxy)-butane were treated with 1 g. of an accelerator listed in the following table and with 1 g. of the solubilizer also designated in the table, and the mixtures thus prepared were used to harden 50 g. of the epoxy resin described in Example 1, at room temperature:

| Accelerator | Without solubilizer | Gelling time (in minutes) with solubilizer | | |
|---|---|---|---|---|
| | | Water (1 g.) | Triethylene glycol (1 g.) | Dimethylformamide (1 g.) |
| None | 90 | 90 | 90 | 90 |
| Potassium chloride | 51 | 21 | 32 | 43 |
| Calcium chloride | 32 | 9 | 15 | 9 |
| Zinc-2-chloride | 19 | 15 | 14 | 17 |
| Manganese-2-sulfate | 48 | 13 | 28 | 38 |
| Aluminum nitrate | 26 | 15 | 14 | 15 |

EXAMPLE 3

1 g. of an accelerator named in the following table was dissolved in 27 g. of a hardener of the type of an amidoamine of long-chained and partially dimerized fatty acids, which is obtainable commercially under the name GMI 250, and the mixture was used to harden 50 grams of the epoxy resin disclosed in Example 1, at room temperature.

| Accelerator: | Gelling time (in minutes) |
|---|---|
| None | 100 |
| Calcium chloride | 29 |
| Calcium nitrate | 32 |
| Barium chloride | 36 |
| Zinc-2-chloride | 32 |
| Sodium chloride | 34 |
| Aluminum nitrate | 39 |

EXAMPLE 4

27 g. of hardener of the type of an amidoamine of long-chained and partially dimerized fatty acids, which is commercially obtainable under the name Versamid 140, were treated with 1 g. of an accelerator as listed in the following table, and 1 g. of water, and this suspension was used to harden 50 g. of the epoxy resin described in Example 1, at room temperature.

| Accelerator: | Gelling time (in minutes) |
|---|---|
| None | 460 |
| Manganese-2-sulfate | 70 |
| Aluminum nitrate | 85 |
| Sodium iodide | 72 |
| Potassium iodide | 65 |
| Iron-2-chloride | 85 |
| Sodium tetraborate | 80 |

What is claimed is:

1. In the process comprising reacting at least one polyepoxide containing the 1,2-epoxy group with a member selected from the group consisting of compounds containing at least one NH group, compounds containing at least one $NH_2$ group and compounds containing at least one NH and one $NH_2$ group, the improvement which comprises effecting said reaction in the presence of 0.1 to 5 wt. percent of a number selected from the group consisting of NaCl, NaBr, NaI, KCl, KBr, KI, $Na_3PO_3$, $Na_2SO_4$, $Na_3PO_4$, $Al_2(SO_4)_3$, $SnCl_2$, $SrCl_2$, $MnCl_2$, $MnSO_4$, $Sr(NO_3)_2$ $Pb(No_3)_2$, $Al(No_3)_3$, $BaCl_2$, $ZnCl_2$, $Ca(NO_3)_2$, $FeCl_2$, and $Na_2B_4O_7$ as accelerator for said reaction, and of a number selected from the group consisting of water, triethylene glycol and dimethylformamide as solubilizer for said accelerator.

2. Process according to claim 1 which comprises employing 0.2 to 3 wt. percent of said solubilizer referred to the epoxide used in said reaction.

3. Process according to claim 1 wherein said epoxide is a diglycidyl ether of 4,4'-isopropylidenediphenol.

4. Process according to claim 1 wherein said amino compound is bis-1,4-(γ-aminopropoxy)-butane.

5. Process according to claim 1 wherein said epoxide is a diglycidyl ether of 4,4'-isopropylidenediphenol and said amino compound is bis-1,4-(γ-aminopropoxy)-butane.

References Cited

UNITED STATES PATENTS 2,909,494  10/1959  Parry et al.
3,018,262  1/1962  Schroeder.

FOREIGN PATENTS 1,285,881  1/1962  France.

WILLIAM H. SHORT, Primary Examiner

T. PERTILLA, Assistant Examiner

U.S. Cl. X.R.

260—2, 59